United States Patent
Henderson et al.

(10) Patent No.: US 7,844,371 B2
(45) Date of Patent: Nov. 30, 2010

(54) FAILSAFE REMOTE DATA CONCENTRATOR

(75) Inventors: Eric Alan Henderson, Rockford, IL (US); Bruce D. Beneditz, Roscoe, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 359 days.

(21) Appl. No.: 11/968,765

(22) Filed: Jan. 3, 2008

(65) Prior Publication Data
US 2009/0177338 A1 Jul. 9, 2009

(51) Int. Cl.
*G01C 23/00* (2006.01)
(52) U.S. Cl. ............... 701/3; 701/33; 340/945
(58) Field of Classification Search ........ 701/2, 701/3, 33, 34, 36; 340/945; 702/188; 342/357.09, 342/357.1
See application file for complete search history.

(56) References Cited

U.S. PATENT DOCUMENTS

| | | | |
|---|---|---|---|
| 4,197,427 A | 4/1980 | Hutcheson | |
| 4,706,017 A | 11/1987 | Wilson | |
| 4,947,116 A | 8/1990 | Welcome | |
| 5,965,819 A | 10/1999 | Piety | |
| 6,204,778 B1* | 3/2001 | Bergan et al. | 340/936 |
| 6,253,064 B1* | 6/2001 | Monroe | 455/66.1 |
| 6,272,552 B1 | 8/2001 | Melvin | |
| 7,215,252 B2 | 5/2007 | Schenck | |
| 7,233,876 B2* | 6/2007 | Halstead et al. | 702/130 |
| 7,263,905 B2 | 9/2007 | Seffernick | |
| 7,280,935 B2 | 10/2007 | Edwards | |
| 2002/0175831 A1* | 11/2002 | Bergan et al. | 340/908.1 |
| 2004/0128099 A1 | 7/2004 | Summers | |

* cited by examiner

*Primary Examiner*—Gertrude Arthur Jeanglaud
(74) *Attorney, Agent, or Firm*—Carlson, Gaskey & Olds

(57) ABSTRACT

A remote data concentrator receives signals from a plurality of sensors. The plurality of sensors are for use on an aircraft. Each of the sensors have their signals split between at least two flow paths, such that each of the sensors are provided with redundancy. The remote data concentrator is also utilized as part of an aircraft electrical control system.

9 Claims, 2 Drawing Sheets

FAILSAFE REMOTE DATA CONCENTRATOR

BACKGROUND OF THE INVENTION

This application relates to a remote data concentrator, wherein data supplied by a plurality of sensors is sent through parallel paths such that one failed component in a concentrator will not cause the loss of information from any sensor.

Sensors, and in particular in aircraft, may sense the position of a switch, temperature, pressure, proximity, etc. Such sensors are located throughout an aircraft.

In the past, hard wiring has been used to connect each of these sensors to various controllers, or to the flight deck. Of course, this resulted in large amounts of wire.

Recently, aircraft have been provided with remote data concentrators (RDCs) to be mounted throughout the aircraft to collect the sensor data. A serial communication bus is used to route the information from the RDCs to downstream equipment.

Some of these RDCs have failure modes that could result in the loss of a large quantity of input data. This may lead to loss of a control function, which is undesirable.

SUMMARY OF THE INVENTION

In a disclosed embodiment of this invention, signals either going to or from an RDC are provided along redundant streams such that the loss of some of the two streams will not mean all sensor information will be lost. In a disclosed embodiment, the RDC includes plural digital signal processing controllers.

These and other features of the present invention can be best understood from the following specification and drawings, the following of which is a brief description.

DETAILED DESCRIPTION OF THE PREFERRED EMBODIMENT

Figure 1:
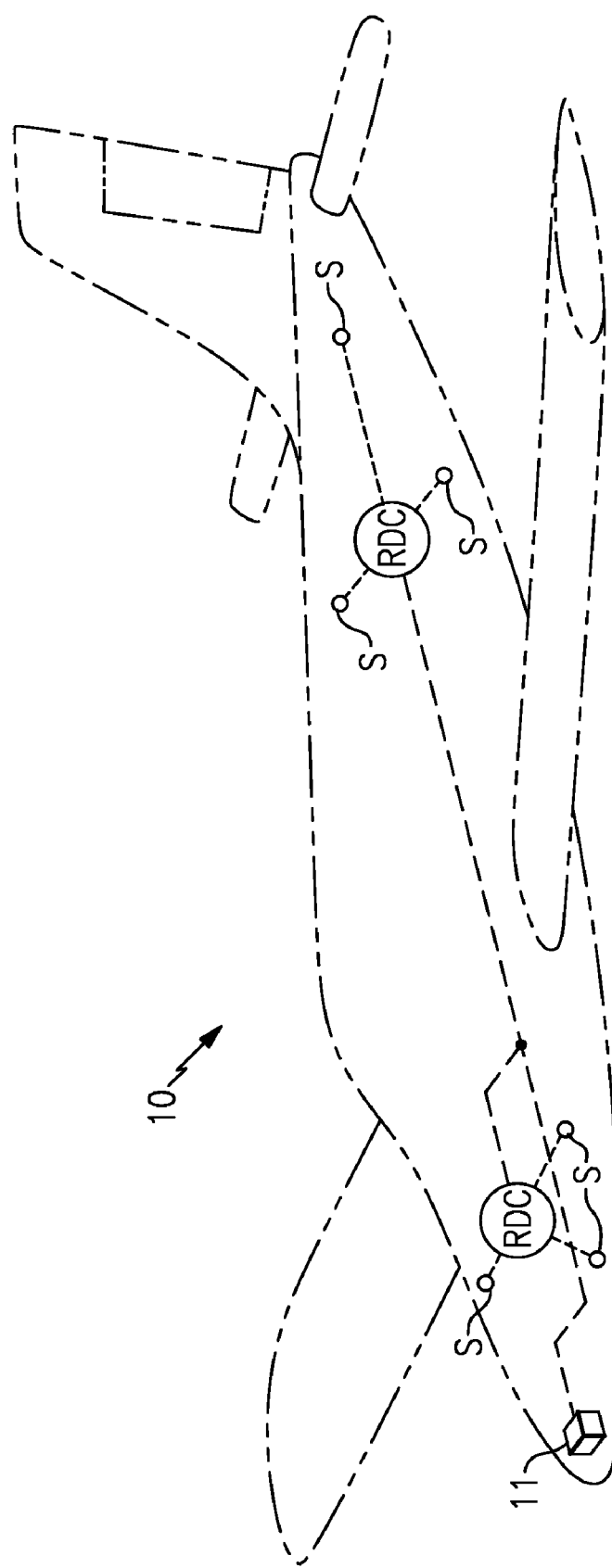
FIG. 1 is a schematic view showing an aircraft including a plurality of sensors.

An aircraft 10 is illustrated in FIG. 1. A plurality of sensors S each communicate through an RDC with the aircraft. The RDCs may communicate forwardly to the flight deck 11 or other controller.

Figure 2:
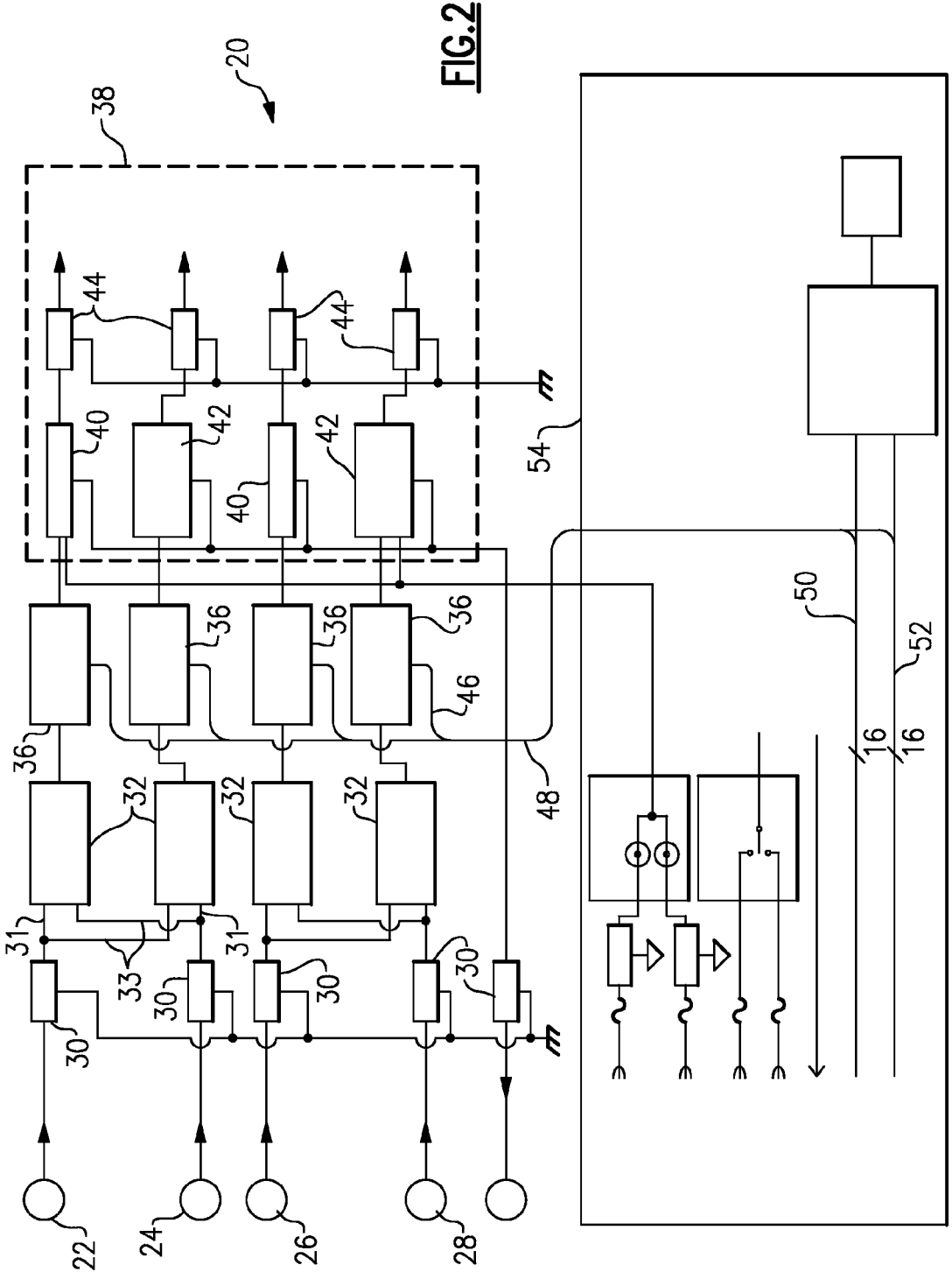
FIG. 2 is a schematic view of a remote data concentrator for the aircraft of FIG. 1.

One RDC 20 is illustrated in FIG. 2. As shown, a plurality of sensors 22, 24, 26, and 28 communicate downstream through filters 30. As can be appreciated, downstream of each of the filters 30, each of the sensor signals are split between lines 31 and 33. Thus, each of the two signals pass through a distinct input conditioning box 32, and travel to two signal processing controllers 36. Thus, should any one of the signal processing controllers 36 fail, the sensor information will not be lost. Downstream of the signal processing controllers is a box 38 which provides output processing of signals, and includes ground/opening signals 40, and output conditioning 42, along with filters 44. This portion of the RDC 20 is as known in the art.

In addition, a pair of lines 50 & 52 are connected at 48 & 46 to each of the signal processing controllers 36, and moves downstream to a module control interface 54. Thus, should either of the lines 50 or 52 fail, the overall signal will still pass to an appropriate controller.

In sum, information from a sensor leading to a signal processing controller is split such that failure of any one signal processing controller will not cause loss of sensor information. Similarly, the information downstream of the signal processing controller is split between two lines such that the loss of either line will not cause loss of all sensor information.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A remote data concentrator system comprising:
   a plurality of sensors to be utilized on an aircraft, each of said plurality of sensors delivering sensor signals downstream through at least two signal streams;
   a plurality of signal processing controllers having their sensor signals split to be delivered to at least two of said signal processing controllers; and
   signals passing downstream from said signal processing controller to a module control interface, and a signal being sent from said module control interface being split between two lines to provide redundancy.

2. The remote data concentrator system as set forth in claim 1, wherein said sensors are provided in pairs, and each of said sensors within a pair communicate with the same two signal processing controllers.

3. A remote data concentrator system comprising:
   a plurality of sensors to be utilized on an aircraft, each of said plurality of sensors delivering sensor signals downstream through at least two signal streams;
   a plurality of signal processing controllers having their sensor signals split to be delivered to at least two of said signal processing controllers; and
   said sensor signals pass through a filter, and then are split before passing into input conditioning, and then being delivered to said signal processing controllers.

4. The remote data concentrator system as set forth in claim 3, wherein signals pass downstream from said signal processing controller to a module control interface, and a signal being sent from said module control interface being split between two lines to provide redundancy.

5. An aircraft electrical control system comprising:
   a plurality of sensors, said plurality of sensors communicating with a common remote data concentrator;
   a plurality of signal processing controllers in said remote data concentrator, said plurality of sensors having their signals split to be delivered to at least two of said signal processing controllers;
   said sensors being provided in pairs, and each said sensor within a pair communicating with the same two signal processing controllers;
   signals passing downstream from said signal processing controllers to a module control interface; and
   a signal from said module control interface being split between two lines to provide redundancy.

6. An aircraft electrical control system comprising:
   a plurality of sensors utilized on an aircraft, each of said plurality of sensors delivering sensor signals downstream;
   a plurality of signal processing controllers, and each of said plurality of sensors having their sensor signals split to be delivered to at least two of said signal processing controllers; and signals pass downstream from said signal processing controllers to a module control interface, and a signal being sent from said module control interface being split between two lines to provide redundancy.

7. The system as set forth in claim 6, wherein said plurality of sensors are provided in pairs, and each of said sensors within a pair communicate with the same two signal processing controllers.

8. An aircraft electrical control system comprising:

a plurality of sensors utilized on an aircraft, each of said plurality of sensors delivering sensor signals downstream;

a plurality of signal processing controllers, and each of said plurality of sensors having their sensor signals split to be delivered to at least two of said signal processing controllers; and said sensor signals pass through a filter, and then are split before passing into input conditioning, and then being delivered to said signal processing controllers.

9. The system as set forth in claim 8, wherein signals pass downstream from said signal processing controllers to a module control interface, and a signal being sent from said module control interface being split between two lines to provide redundancy.

* * * * *